Patented Jan. 8, 1935

1,986,798

UNITED STATES PATENT OFFICE 1,986,798

PROCESS FOR HALOGENATING AMINO-ANTHRAQUINONE COMPOUNDS

William Dettwyler, Milwaukee, Wis., assignor to E. I. du Pont de Nemours & Company, Wilmington, Del., a corporation of Delaware No Drawing. Application January 12, 1934, Serial No. 706,407

4 Claims. (Cl. 260—60)

This invention relates to an improved process for halogenating amino-anthraquinone compounds in which the amino group may be unsubstituted, substituted, or in which it may be one of the members of a heterocyclic ring.

It is known that anthraquinone compounds may be halogenated in the presence of catalytic quantities of aluminum or iron chloride, and that in some instances nitrobenzene may be used as the medium or solvent in which the halogenation may be carried out. In many of these processes, however, in which the starting material or final halogenated product is not soluble in the nitrobenzene, the halogenation is often hard to control to avoid the formation of isomeric or higher halogenated bodies. Furthermore, relatively high temperatures are often necessary to force the reaction to completion, and this also tends to produce isomeric bodies which must then be separated from the desired compound.

I have now found that these nitrogen containing anthraquinone compounds may be halogenated at relatively low temperatures and the resulting product obtained in a more pure form, if sufficient aluminum or iron chloride is used with nitrobenzene as the diluent to keep the mass, at least to a large degree, in solution. I have discovered that by the use of relatively large amounts of aluminum or iron chloride the reaction proceeds in a smooth and easily controllable manner. These large quantities also appear to exert a marked directing influence on the halogenation, giving a product containing a minimum amount of isomers and higher halogenation compounds.

The amount of aluminum chloride which must be used to obtain these improved results depends upon the relative solubility of the amino compounds and their halogenation products in the metallic chloride-nitrobenzene mixture. Where the amine is relatively insoluble in nitrobenzene, larger quantities of aluminum chloride are required to put it in solution. In general, amounts approximating molecular quantities of aluminum chloride and amino-anthraquinone compounds have been found to give good results, and in all such cases a marked improvement in yield and quality of the ultimate halogen product is obtained over the use of aluminum chloride in catalytic or in amounts up to 5% based on the anthraquinone compound being halogenated. It is desirable that sufficient aluminum chloride in conjunction with nitrobenzene should be used to retain the amino-anthraquinone and reaction products in solution at room temperature.

It is believed that this peculiar effect is obtained due to a temporary combination of the amino body with the complex that forms by the reaction of aluminum chloride with nitrobenzene, although we do not intend to be limited in any manner by the correctness or incorrectness of this theory.

The following examples are given to more fully illustrate my invention. The parts used are by weight.

Example 1

Charge into 800 parts of dry nitrobenzene, 50 parts of ground aluminum chloride. When complete solution is obtained, add 100 parts of 1-amino-anthraquinone.

A red solution is obtained. Stir this red solution for ½ hour at 25–30° C. and add then 70 parts of sulphuryl chloride in 2 parts. The temperature will rise to 40–45° C. after each addition. Then maintain at 40° C. for 3 hours and pour the contents into cold water and remove the nitrobenzene by steam distillation. Filter the insoluble matter and wash free of salt.

The obtained product contains from 13.8 to 14.2% combined chlorine and consists of 1-amino-4-chlor-anthraquinone. From $\tfrac{1}{10}$ to 1 part of $AlCl_3$ has been shown to give good results in this example.

Example 2

Add to a prepared solution of 200 parts of nitrobenzene and 10 parts of freshly ground aluminum chloride, 20 parts of 1-N-methylamino-anthraquinone. Stir the red solution for ½ hour and then add in 2 portions 14 parts of sulphuryl chloride so that the temperature rises to about 40–45° C. Stir at 40° for 3 hours and pour the whole into cold water. Remove the nitrobenzene with steam. The isolated product consists of 1-N-methylamino-4-chlor-anthraquinone.

Example 3

Dissolve 10 parts of aluminum chloride in 200 parts of nitrobenzene and add 20 parts of 1,5-diamino-anthraquinone.

Stir the violet solution for ½ hour and add 24 parts of sulphuryl chloride in two portions so that the temperature goes up to 45° C. Stir at 40° C. for 3 hours, pour into cold water and steam distil. The product consists mostly of 1,5-diamino-4,8-dichlor-anthraquinone. It contains 23.7% $Cl_2$. (Theory 23.15%.)

Example 4

Add to a prepared solution of 500 parts of nitrobenzene and 50 parts of aluminum chloride, 50 parts of 1,1'-dianthraquinone-imine.

Stir the blue solution for ½ hour and add at 25–30° C., 32 parts of sulphuryl chloride.

Heat to 40° and keep at 40° for 12 hours, pour into cold water and steam distil and isolate. The product contains 14.0–14.2% chlorine and constitutes 4,4'-dichloro-1,1'-dianthraquinone imine.

Example 5

Add to 500 parts of nitrobenzene, 25 parts of ferric chloride and 100 parts of 1-amino-anthraquinone.

Stir the brown solution for ½ hour and add slowly, at 25–35°, 70 parts of sulphuryl chloride.

Heat slowly to 40° C. and hold for three hours at 40° C. Then pour into cold water and isolate as per Example 1.

Example 6

Prepare a solution of 50 parts of 1-amino-anthraquinone in 300 parts of nitrobenzene and 25 parts of aluminum chloride (as explained in Example 1). Heat to 45–50° and pass in 35 parts of chlorine gas. The chlorine is absorbed very readily. Then dilute with cold water and isolate. The obtained chlor-amino-anthraquinone is identical with Example 1.

Example 7

Add 80 parts of bromine to a prepared solution of 100 parts of 1-amino-anthraquinone in 800 parts of nitrobenzene and 50 parts of aluminum chloride and heat to 40° C., maintain at this temperature for 2 hours and steam distil.

The isolated product consists mostly of 1-amino-2-brom-anthraquinone, as it gives indanthrone on condensation with itself. It contains 26–27% bromine.

Example 8

Dissolve 20 parts of 1,2-anthraquinone-naphthacridone in 200 parts of nitrobenzene and 20 parts of aluminum chloride. Add to the brown solution 30 parts of sulphuryl chloride.

Heat to 80° C. and maintain this temperature for 16 hours. Isolate by steam distillation.

The new compound contains 1 chlorine atom, most probably in the 4-position.

Example 9

Chlorinate 20 parts of indanthrone the same way as outlined in Example 8. A dichloro-indanthrone is obtained which resembles in its properties and behavior the 3,3'-dichloro-indanthrone.

Example 10

Dissolve 20 parts of 2-amino-anthraquinone in 200 parts of nitrobenzene and 10 parts of aluminum chloride. Stir ½ hour and add 12 parts of sulphuryl chloride.

Stir at room temperature for 4 hours and steam distil the whole free of nitrobenzene.

The obtained product consists mostly of 1-chlor-2-amino-anthraquinone which may be obtained in pure form by fractional crystallization from sulphuric acid.

Example 11

Add to a prepared solution of 80 parts of nitrobenzene and 5 parts of aluminum chloride, 10 parts of 1-amino-2-methyl-anthraquinone.

Stir the violet solution ½ hour and add 5.8 parts of sulphuryl chloride.

The mass heats up to 50° C. and hydrochloric acid is evolved. Cool to 20° C. and stir for 12 hours, then remove nitrobenzene by steam distillation and isolate by filtration the formed 1-amino-2-methyl-4-chloro-anthraquinone.

Example 12

Chlorinate 20 parts of 8-amino-2,1-acridone in 200 parts of nitrobenzene and 10 parts of aluminum chloride with 8 parts of sulphuryl chloride at room temperature for 4 hours and isolate as usual.

The new compound is most probably 8-amino-5-chlor-2,1-acridone.

Example 13

Dissolve 10 parts of Bzl-amino-benzanthrone in 100 parts of nitrobenzene and 5 parts of aluminum chloride and add 7 parts of sulphuryl chloride.

Keep at 20–25° for 12–16 hours and isolate in the above described manner.

A monochlor-monoamino-benzanthrone is the resulting compound.

Example 14

Add 5.6 parts of anhydrous aluminum chloride to 100 parts of nitrobenzol. Stir for twenty minutes. Then add 10 parts of 1-methylamino-anthraquinone. Stir until entirely in solution. The temperature will rise to about 35° C. At 30–35° C., add 6.7 parts of bromine over a period of 2–3 hours. The solution becomes violet colored. Agitate at room temperature for 8–12 hours and pour out into 63 parts of cold water to decompose the aluminum chloride. Steam distil the mass until all the nitro-benzol has been removed. The 1-methylamino-4-brom-anthraquinone is obtained in the form of dark red crystals.

In the examples given, iron chloride may be used in place of aluminum chloride and any of the known halogenating agents may be used in place of those specifically mentioned.

In the claims, where the term "amino-anthraquinone compounds" is used, it is intended to cover the amino compounds of anthraquinone in which the amino group is unsubstituted, substituted, or in which it may form part of a heterocyclic ring, which latter type is illustrated in the examples by the azine and acridone compounds.

I claim:

1. In the halogenation of amino-anthraquinone compounds, the step which comprises carrying out the halogenation in nitrobenzene and a sufficient amount of a metal chloride taken from the group consisting of aluminum chloride and iron chloride, to maintain the amino-anthraquinone compound and the resulting halogenation product in solution.

2. In the halogenation of amino-anthraquinone compounds, the step which comprises carrying out the halogenation in a mixture of nitrobenzene and aluminum chloride, sufficient aluminum chloride being used to maintain the amino-anthraquinone and the resulting halogenation product in solution.

3. In the halogenation of amino-anthraquinone compounds, the step which comprises carrying out the halogenation in nitrobenzene in which has been dissolved substantially one molecular quantity of aluminum chloride for each mol of the amino-anthraquinone to be halogenated.

4. In the halogenation of amino-anthraquinone compounds, the step which comprises carrying out the halogenation at relatively low temperatures in a solution of aluminum chloride in nitrobenzene, the amount of nitrobenzene used being insufficient to maintain the amino-anthraquinone compound and the resulting chlorination product in solution at the temperature of the reaction.

WILLIAM DETTWYLER.